(12) United States Patent
Cormack et al.

(10) Patent No.: US 11,449,396 B2
(45) Date of Patent: Sep. 20, 2022

(54) FAILOVER SUPPORT WITHIN A SOC VIA STANDBY DOMAIN

(71) Applicant: Intel Corporation, Santa Clara, CA (US)

(72) Inventors: Christopher Cormack, Portland, OR (US); David J. Cowperthwaite, Portland, OR (US); Matthew Curfman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 16/573,364

(22) Filed: Sep. 17, 2019

(65) Prior Publication Data

US 2020/0012576 A1 Jan. 9, 2020

(51) Int. Cl.
| | |
|---|---|
| *G06F 11/14* | (2006.01) |
| *G06F 9/455* | (2018.01) |
| *G06F 13/42* | (2006.01) |
| *B60W 50/04* | (2006.01) |
| *B60W 50/00* | (2006.01) |

(52) U.S. Cl.
CPC ....... *G06F 11/1482* (2013.01); *B60W 50/045* (2013.01); *G06F 9/45558* (2013.01); *G06F 13/4221* (2013.01); *B60W 2050/0095* (2013.01); *G06F 2201/805* (2013.01); *G06F 2213/0024* (2013.01)

(58) Field of Classification Search
None
See application file for complete search history.

(56) References Cited

U.S. PATENT DOCUMENTS

| 9,652,315 B1* | 5/2017 | Aquino | G06F 11/1008 |
|---|---|---|---|
| 2017/0102995 A1* | 4/2017 | Gupta | G06F 11/1076 |
| 2021/0034136 A1* | 2/2021 | Hovis | G06F 1/3275 |

\* cited by examiner

*Primary Examiner* — Craig C Dorais
(74) *Attorney, Agent, or Firm* — Schwabe, Williamson & Wyatt, P.C.

(57) ABSTRACT

In various embodiments, an apparatus includes a system-on-chip (SoC) to be disposed in a vehicle having a plurality of cores; a hypervisor arranged to partition the cores into at least two domains, an operational domain and a failover domain; a first operating system (OS) arranged to manage execution of at least a first application in the operational domain to provide a first plurality of functions for the vehicle; a second OS arranged to manage execution of at least a second application in the failover domain to provide a second plurality of functions for the vehicle, on occurrence of a failure of the first application. The second functions comprise a subset of the first functions or less embellished versions of some of the first functions, and the second OS has less capabilities than the first OS. Other embodiments, including storage media and methods, are also described and claimed.

25 Claims, 9 Drawing Sheets

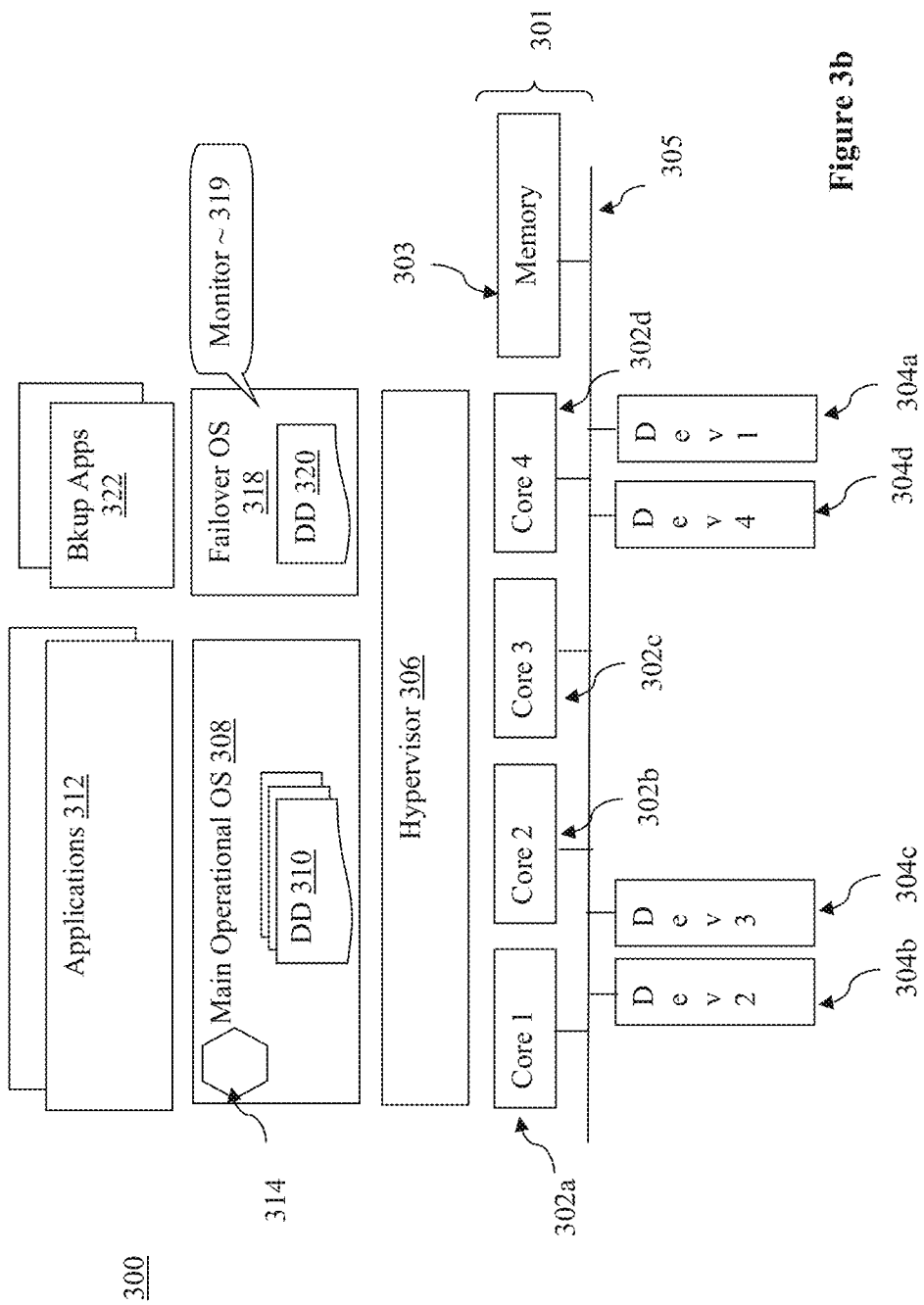

FAILOVER SUPPORT WITHIN A SOC VIA STANDBY DOMAIN

TECHNICAL FIELD

The present disclosure relates to the field of computer-assisted or autonomous driving (CA/AD). More particularly, the present disclosure relates to the provision of backup or failover support for critical and/or safety sensitive/consequential tasks of an in-vehicle system of a CA/AD vehicle.

BACKGROUND

With advances in integrated circuits, sensors, computing and related technologies, increasingly, more and more operations of a vehicle can receive computer assistance, from parallel parking, to lane changing, and so forth, to fully autonomous driving, with the vehicle driving itself without the need of a driver/operator. Typically, an in-vehicle system of a CA/AD vehicle includes critical and/or safety sensitive/consequential tasks, e.g., the rendering and displaying of the instrument cluster, including vehicle and engine speed indicators, engine oil temperature and other warning indicators.

Previous solutions to provide backup or failover support for critical and/or safety sensitive/consequential tasks have generally included provision of fully redundant hardware devices (i.e., a second central processing unit (CPU) and/or a second graphical processing unit (GPU) to assume the functionality of the primary CPU/GPU in the event the primary CPU/GPU fails). These prior solutions are costly. Additionally, these prior solutions have complexity challenges. Switching over from a primary hardware component to a secondary redundant hardware component not only requires the provisioning of the secondary redundant hardware component, but also the infrastructure required to switch output devices (audio, display, and so forth) to the secondary redundant component. This adds additional complexity, as well as further cost.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 3a-3b illustrate component views of selected components of an example in-vehicle system, according to various embodiments.

DETAILED DESCRIPTION

Figure 1:
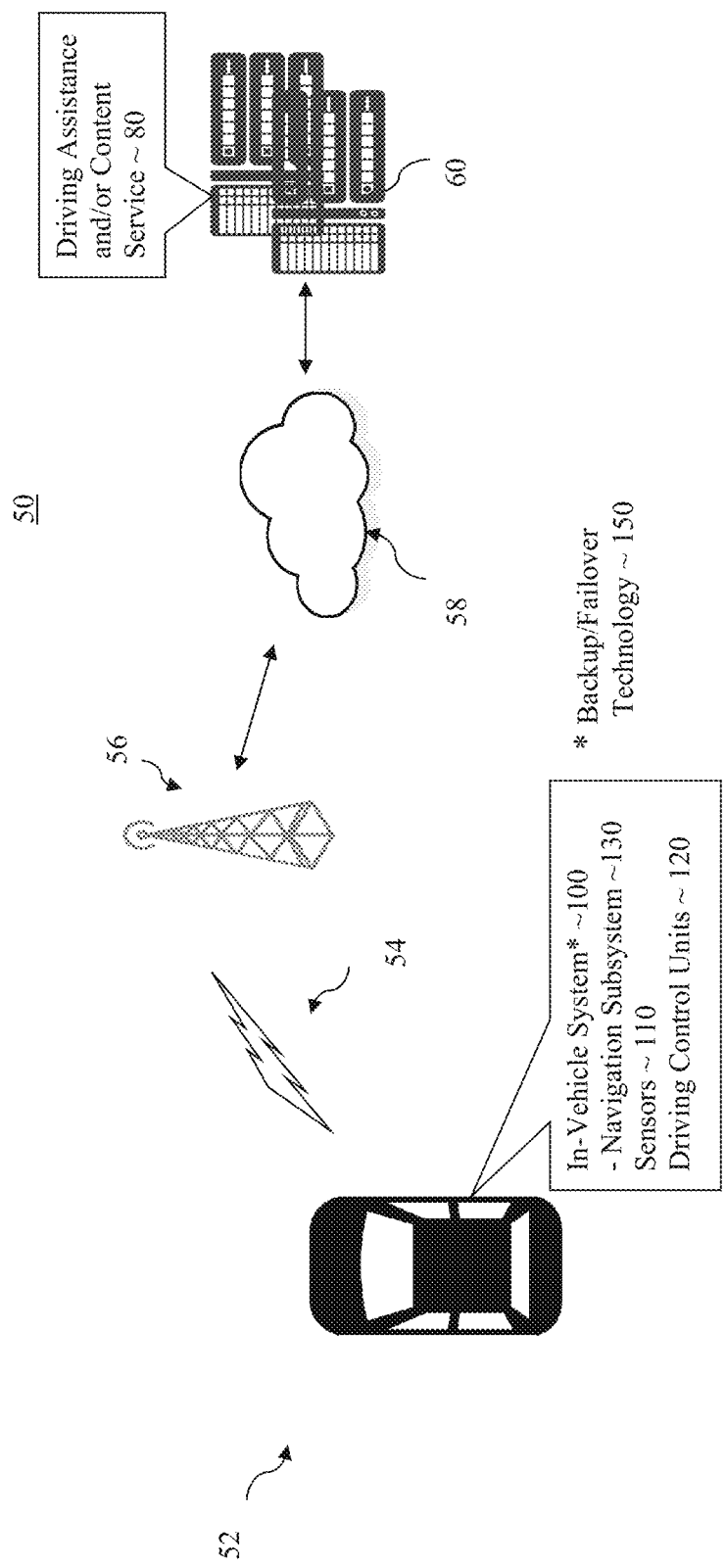
FIG. 1 illustrates an overview of an environment for incorporating and using the failover/backup technology of the present disclosure, in accordance with various embodiments.

To address the above discussed technical challenges, apparatuses, storage media and methods associated with in-vehicle systems of CA/AD vehicles, in particular, in association with the provision of failover/backup support, are disclosed herein.

In various embodiments, an apparatus includes a system-on-chip (SoC) to be disposed in a vehicle and having a plurality of cores; a hypervisor arranged to partition the cores into at least two domains, an operational domain and a failover domain; a first operating system (OS) arranged to operate and manage execution of at least a first application in the operational domain to provide a first plurality of functions for the vehicle; and a second OS arranged to operate and manage execution of at least a second application in the failover domain to provide a second plurality of functions for the vehicle, on occurrence of a failure of the first application. The second plurality of functions comprise a subset of the first plurality of functions or less embellished versions of some of the first plurality of functions, and the second OS has less capabilities than the first OS.

In various embodiments, a method for vehicular computing comprises hosting, by a hypervisor of a system-on-chip (SoC) disposed in a vehicle, an operational domain having a main operating system managing execution of a critical task of an in-vehicle system of the vehicle, and a backup domain having a backup operating system semi-actively standing by; receiving, by the hypervisor, from the backup operating system, a request to re-assign a device from the operational domain to the backup domain, submitted in response to the critical task being in an impaired or inoperative state; and in response to the request, re-assigning the device, by the hypervisor, from the operational domain to the backup domain to enable the backup operating system to launch execution of a backup version of the critical task in the backup domain to substitute for the critical task in the operational domain.

In various embodiments, one or more computer-readable media includes a plurality of instructions to cause a SoC of an in-vehicle system of a vehicle, in response to execution of the instructions by one or more cores of the SoC, to operate a safety operating system (OS) in a safety domain of the SoC to: semi-actively stand by to detect for impairment or failure of operation of a safety consequential task hosted by a main OS in an operational domain of the SoC; on detection of the safety consequential task being in the impaired or inoperable state, request re-assignment of a device from the operational domain to the safety domain; and on re-assignment of the device from the operational domain to the safety domain, become active and initiate execution of a safety version of the safety consequential task in the safety domain, and to replace the impaired or inoperable safety consequential task of the operational domain.

Other embodiments are also described in the detailed description to follow, and claimed in the claim section.

In the following detailed description, these and other aspects of the failover/backup technology will be further described. References will be made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" or "engine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an environment for incorporating and using the failover/backup technology of the present disclosure, in accordance with various embodiments, is illustrated. As shown, for the illustrated embodiments, example environment 50 includes vehicle 52. Vehicle 52 includes an engine, transmission, axles, wheels and so forth (not shown). Further, vehicle 52 includes an in-vehicle system 100, sensors 110, and driving control units (DCUs) 120. In-vehicle system 100 includes various applications, e.g., navigation subsystem 130, some of which include critical and/or safety sensitive/consequential tasks. Further, in-vehicle system 100 includes the failover/backup technology of the present disclosure, to be described more fully below.

In various embodiments, navigation subsystem 130 may be configured to provide navigation guidance or control, depending on whether CA/AD vehicle 52 is a computer-assisted vehicle, partially or fully autonomous driving vehicle. Navigation subsystem 130 may be configured with computer vision to recognize stationary or moving objects (such as a traveler or a moving object) in an area surrounding CA/AD vehicle 52, as it travels enroute to its destination. In various embodiments, navigation subsystem 130 may be configured to recognize stationary or moving objects in the area surrounding CA/AD vehicle 52, and in response, make its decision in guiding or controlling DCUs of CA/AD vehicle 52, based at least in part on sensor data collected by sensors 110.

Sensors 110 may include one or more cameras (not shown) to capture images of the surrounding area of CA/AD vehicles 52. In various embodiments, sensors 110 may also include light detection and ranging (LiDAR) sensors, accelerometers, gyroscopes, global positioning system (GPS) circuitry, and so forth. Examples of driving control units (DCU) may include control units for controlling engine, transmission, brakes of CA/AD vehicle 52.

In various embodiments, in addition to navigation subsystem 130, in-vehicle system 100 may further include a number of infotainment subsystems/applications, e.g., instrument cluster subsystem/application, front seat infotainment subsystem/application, such as, a navigation subsystem/application, a media subsystem/application, a vehicle status subsystem/application and so forth, and a number of rear seat entertainment subsystems/applications (not shown). Instrument cluster subsystem/applications may include critical and/or safety sensitive/consequential tasks, which are provided with failover/backup support, to be described more fully below.

In various embodiments, in-vehicle system 100, on its own or in response to user interactions, communicates or interacts 54 with one or more remote/cloud servers 60. In various embodiments, remote/cloud servers 60 may include any one of a number of driving assistance (such as map) or content provision (such as multi-media infotainment) services 80 known in the art.

In various embodiments, in-vehicle system 100 communicates 54 with server 60 via cellular communication, e.g., via a wireless signal repeater or base station on transmission tower 56 near vehicle 52. Examples of private and/or public wired and/or wireless networks 58 may include the Internet, the network of a cellular service provider, and so forth. It is to be understood that transmission tower 56 may be different towers at different times/locations, as vehicle 52 travels enroute to its destination or personal system 150 moves around. Further, it is noted that while a car is shown as vehicle 52, in other embodiments, vehicle 52 may be a truck, a bus, a boat, a plane, or an unmanned aerial vehicle.

Except for the failover/backup technology of the present disclosure provided, in-vehicle system 100 and CA/AD vehicle 52 otherwise may be any one of a number of in-vehicle systems and CA/AD vehicles, from computer-assisted to partially or fully autonomous vehicles, known in the art. These and other aspects of the underlying failover/backup technology used to efficiently and cost effectively enhance the reliability of in-vehicle system 100 will be further described with references to the remaining Figures.

Figure 2A:
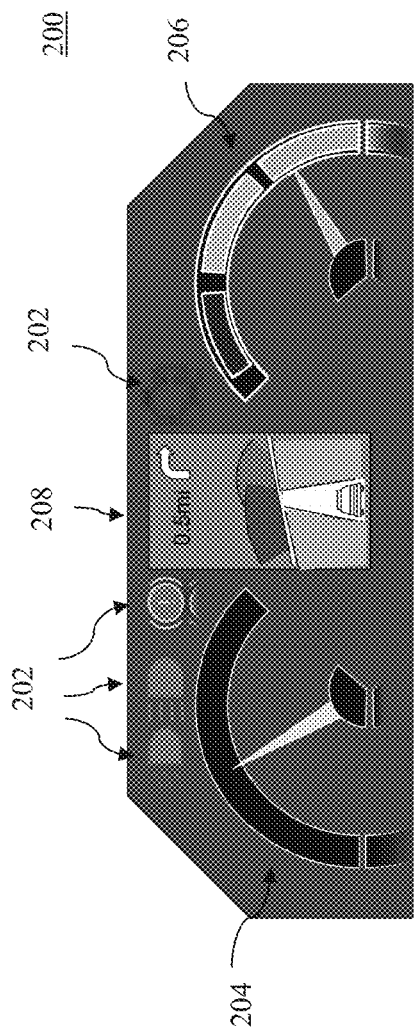
FIGS. 2a-2b illustrate example fully operational and failover/backup versions of an example critical and/or safety sensitive/consequential task, the rendering and displaying of an instrument cluster, according to various embodiments.
Figure 2B:
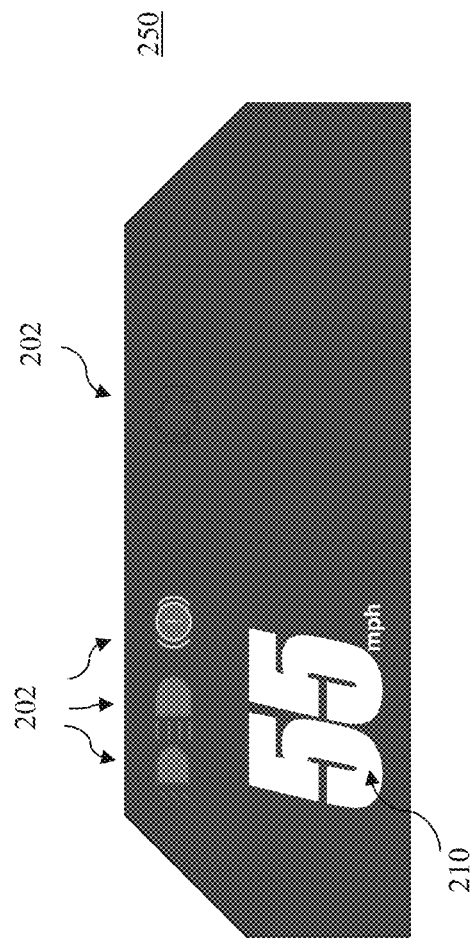

Referring now to FIG. 2a-2b, wherein example fully operational and failover versions of an example critical and/or safety sensitive/consequential task, the rendering and displaying of an instrument cluster, according to various embodiments, are illustrated. As shown in FIG. 2a, when operational, an example instrument cluster subsystem/application may render and display a feature rich, embellished instrument cluster 200 on a display device of the CA/AD vehicle. The feature rich, embellished instrument cluster 200 may include a graphical rendering of a speedometer 204 indicating the current speed (miles per hour (mph) and/or kilometer per hour (kph)) of the CA/AD vehicle, and a graphical rendering of a tachometer 206 indicating the current speed (revolution per minute (RPM)) of the engine of the CA/AD vehicle. The feature rich, embellished instrument cluster 200 may also include a graphical rendering of the navigation guidance 208. Additionally, the feature rich, embellished instrument cluster 200 may also include various indicators 202, such as a head light on indicator, an information notice indicator, and/or an engine check indicator.

FIG. 2b illustrates an example rudimentary instrument cluster 250 that a failover/backup version of the example instrument cluster subsystem/application may render and display, when the example full function instrument cluster subsystem/application failed or otherwise became impaired or inoperative. For the illustrated embodiments, rudimentary instrument cluster 250 merely includes the indicators 202, including the information and/or warning indicators, but not the rich graphics. Instead, some of the rich graphics are either omitted, like the graphical rendering of tachometer 206 and navigation guidance 208 or replaced with a less embellished rendering and displaying of the information, e.g., speedometer 210 having merely the current speed (55 mph) rendered/displayed.

In other words, the failover/backup human interface is less embellished, or more rudimentary than the standard operational human interface. Accordingly, the failover/backup version of the critical or safety sensitive/consequential task may be less complex than the normal operating critical or safety sensitive/consequential task. It follows that a failover/backup operating system to host the executions of a limited number of back/up failover versions of critical or safety sensitive/consequential tasks may be less function rich and less complex than the standard operating system used during normal operation, requiring less hardware resources. It further follows then the failover/backup support of the present disclosure may be provided without fully redundant hardware and/or the added complexities required by prior solutions.

Figure 3A:
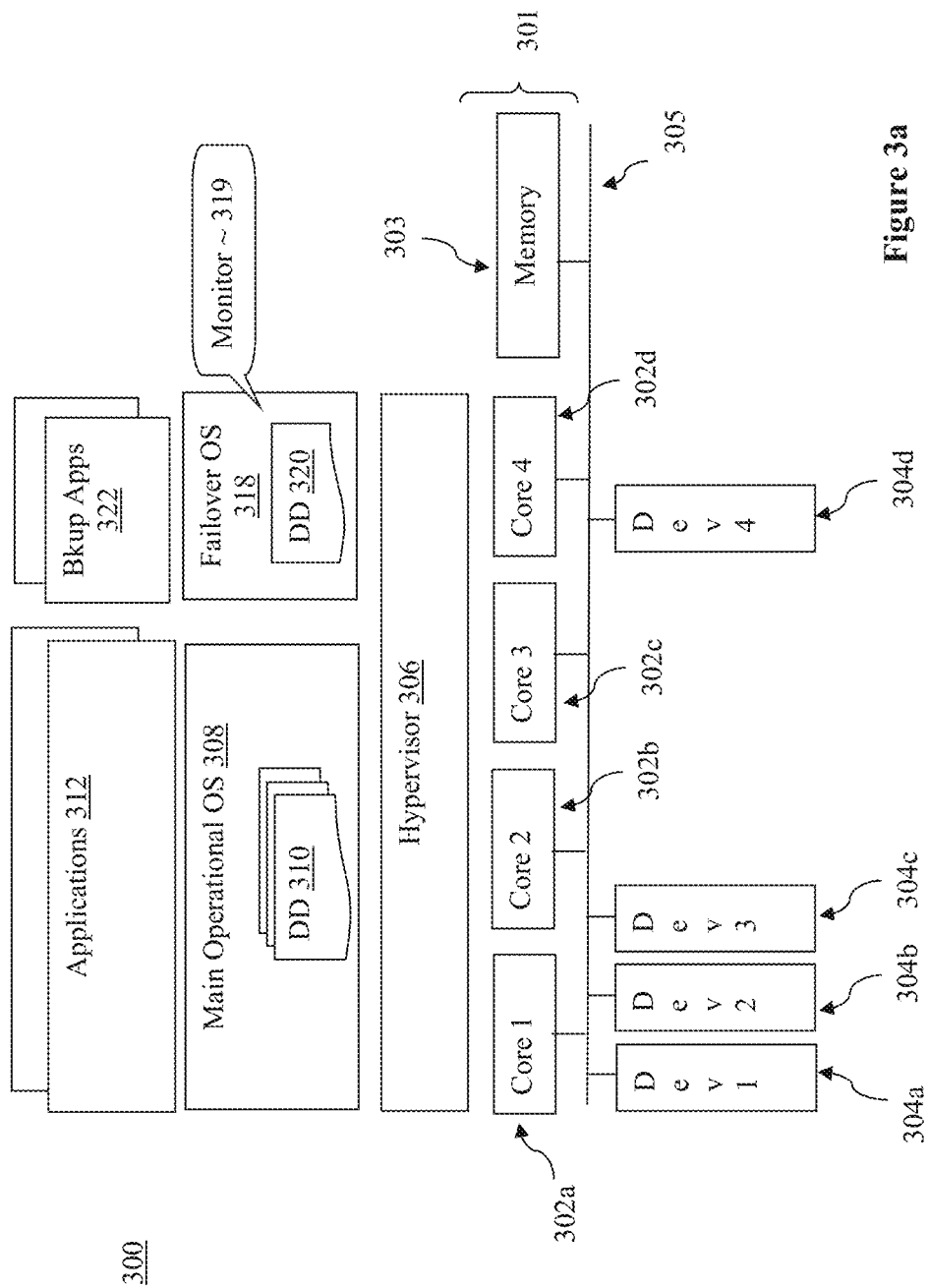

Referring now to FIGS. 3a-3b, wherein two component views of selected components of an example in-vehicle system, according to various embodiments, are shown. As illustrated, example in-vehicle system 300, which may be in-vehicle system 100 of FIG. 1, includes SoC 301 having a number of CPUs or cores 302a-302d and memory 303. Additionally, example in-vehicle system 300 further includes a number of devices 304a-304d coupled to SoC 301 via a system bus 305.

SoC 301 may be a physical SoC or a virtual SoC. The number of cores SoC 301 includes is illustrative only and is not to limit the present disclosure. In alternate embodiments, SoC 301 may have more or less cores. Example system bus 305 is intended to represent one or more system buses. For embodiments with multiple system buses, the system buses may be joined together with one or more bridges to form a hierarchy of buses. Example of system buses may include universal serial buses (USBs), peripheral component interconnect (PCI) buses, and so forth. Examples of devices 304a-304d may include but are not limited to GPUs, microphones, speakers, display devices, cursor control devices, storage devices, and so forth.

For the illustrated embodiments, SoC 301 is configured to host a hypervisor 306. Hypervisor 306 is configured to partition SoC 301 into at least two domains, a main operational domain having main operational OS 308 to host execution of applications 312, some of which having critical and/or safety sensitive/consequential tasks, and a failover/backup domain having failover/backup OS 318 to host execution of a limited number of failover/backup applications 322 to back up the critical and/or safety sensitive/consequential tasks, in the event these critical and/or safety sensitive/consequential tasks failed.

For the illustrated embodiments, main OS 308 and failover/backup OS 318 respectively include a number of device drivers 310 and 320, and various services and utilities (not shown), which may be any number of typical OS services and utilities known in the art. In the case of failover/backup OS 318, it is configured with monitor 319 to monitor the operation of applications 312 and/or main OS 308 to detect for failures 314 of any one of the critical and/or safety sensitive/consequential tasks of applications 312.

During normal operation, when applications 312 and main OS 308 are functioning, failover/backup OS 318 and failover/backup applications 322 are in a semi-active standby state, with failover/backup OS 318 (with monitor 319) monitoring the operation of applications 312 and main OS 308 to detect for failures 314 of any one of the critical and/or safety sensitive/consequential tasks of applications 322. A failure 314 may be due to a task itself, one of applications 312, and/or main OS 308 (or portions thereof).

On detection of occurrence of a failure 314 of a critical and/or safety sensitive/consequential task, failover/backup OS 318 becomes fully active, requests one or more devices needed for the operation of failover/backup application/task 322, but not yet assigned to the failover/backup domain to be re-assigned from the main operational domain to the failover/backup domain. On re-assignment of the needed devices, if any, failover/backup OS 318 launches failover/backup application 322 to substitute for the counterpart critical and/or safety sensitive/consequential task/application 322.

Figure 4A:
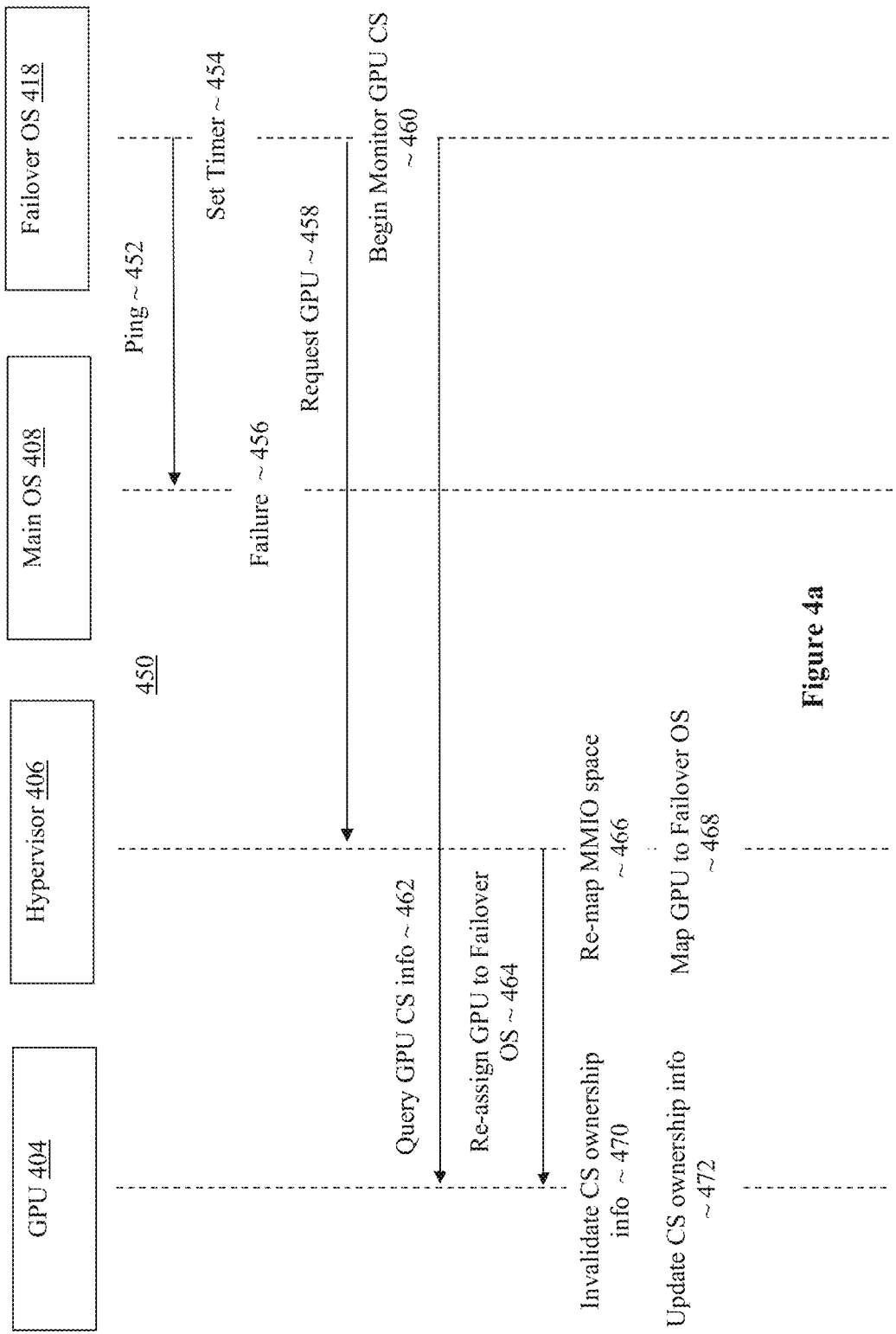
FIGS. 4a-4b illustrate operational flows between an example GPU, a hypervisor, a main operating system (OS), and a failover OS, according to various embodiments.
Figure 4B:
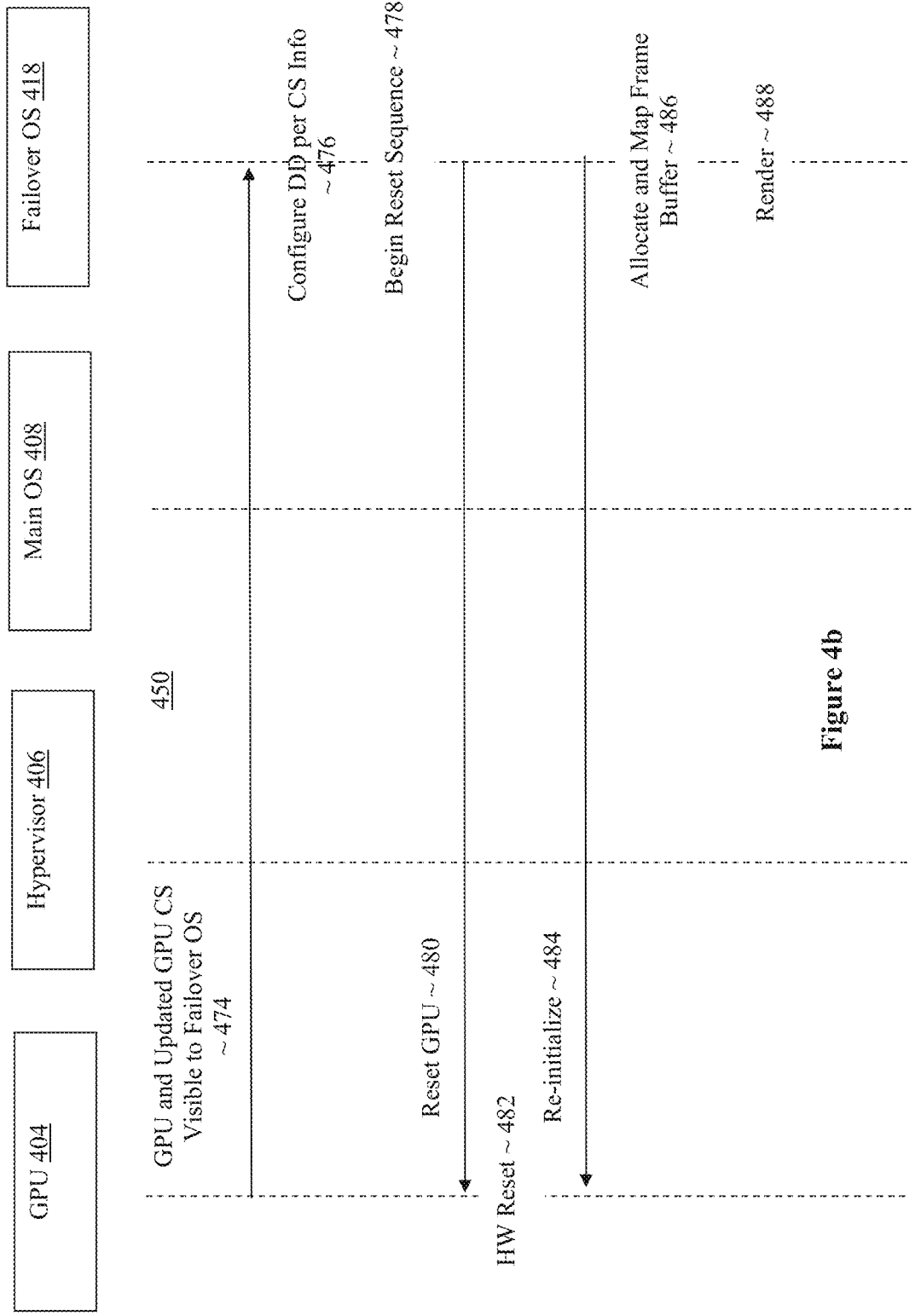

Referring now to FIGS. 4a-4b, wherein an operation flow between an example GPU, a hypervisor, a main operating system (OS), and a failover OS, according to various embodiments, is shown. As illustrated, for the embodiments, operation flow 450 between GPU 404, hypervisor 406, main OS 408 and failover OS 418 (which may be one of devices 304a-304d, hypervisor 306, main OS 303, and failover OS 318 of FIGS. 3a-3b) includes interactions 452-488. More specifically, as illustrated in FIG. 4a, at interaction 452, failover OS 418 periodically pings main OS 408 for a response to confirm a failure has not occurred with a critical and/or safety sensitive/consequential task/application. For the embodiments, at interaction 454, after each ping, failover OS 418 sets a timer for the maximum amount of elapse time for receiving the response to the ping from main OS 408.

Next, at interaction 456, a failure of the inquired critical and/or safety sensitive/consequential task/application occurs, and main OS 408 fails to provide the response to confirm it is in proper operation. Assuming for the illustrated embodiments, the failover/backup version of the critical and/or safety sensitive/consequential task/application requires the GPU, and during normal operation, the GPU is assigned to the main operational domain, at interaction 458, failover OS 418 requests hypervisor 406 to re-assign the GPU from the main operational domain to the failover/backup domain.

At interaction 460, failover OS 418 begins to monitor the configuration space (CS) of GPU, and at interaction 462, query for GPU's configuration space information.

At interaction 464, in response to the request of failover OS 418 to re-assign GPU, hypervisor 406 informs GPU 404 of the reassignment to the failover/backup domain.

At interaction 466, on informing GPU 404 of the reassignment, hypervisor 406 further un-maps the memory mapped input-output (MMIO) for GPU 404 from main OS 408, and re-maps the memory mapped input-output (MMIO) for GPU 404 to failover OS 418, and at interaction 468, re-programs the virtualization tables (VT) hypervisor 406 maintains for virtualizing the hardware resources for the two domains.

Concurrently, at interaction 470, on being informed of the reassignment, GPU 404 invalidates the ownership (assignment) information in the configuration space, and at interaction 472, updates the ownership (assignment) information in the configuration space, to reflect the failover OS 418 as being assigned, i.e., the current owner of GPU 404.

In various embodiments where GPU may be coupled to the cores of the SoC via a PCI bus, at interaction 462, failover OS 418 may query the PCI configuration space for GPU's configuration space information. At interaction 470, GPU may set vendor identifier:device identifier (vid:did) 0:2.0 to indicate its de-assignment from the main operational domain. At interaction 472, GPU may update vendor identifier:device identifier (vid:did) 0:2.0 with a predetermined value to indicate its assignment to the failover domain.

Referring now to FIG. 4b, after the re-mapping of MMIO and re-programming of the VT tables by hypervisor 406 and updating of the assignment/ownership information in its configuration space by GPU 404, GPU 404 including its updated configuration space information are now visible to the failover OS 418.

At interaction 476, on seeing the ownership information in GPU's configuration space having been updated to reflect itself as the owner (being assigned), failover OS 418 accepts and applies the configuration information in GPU's configuration space, e.g., configuring its device driver(s) accordingly.

Next, at interaction 478, failover OS 418 begins a reset sequence.

At interaction 480, failover OS 480 requests GPU 404 to perform a hardware reset. In response, at interaction 482, GPU 404 performs a hardware reset. In various embodiments, the hardware reset may include resetting a rendering engine as well as a display engine of GPU 404.

Next, at interaction 484, failover OS 418 reinitializes GPU 404 after the hardware reset. In various embodiments, reinitializing GPU 404 includes reinitializing the display engine of GPU 404.

On re-initialization of the display engine of GPU 404, at interaction 486, failover OS 418 may allocate and map a number of frame buffers in the memory of SoC for GPU 404. Next, at interaction 488, failover OS 418 may start rendering the outputs of the failover version of the critical and/or safety sensitive/consequential task/application via the mapped frame buffers for GPU 404 to ultimately render the outputs on a display device of the CA/AD vehicle.

Figure 5:
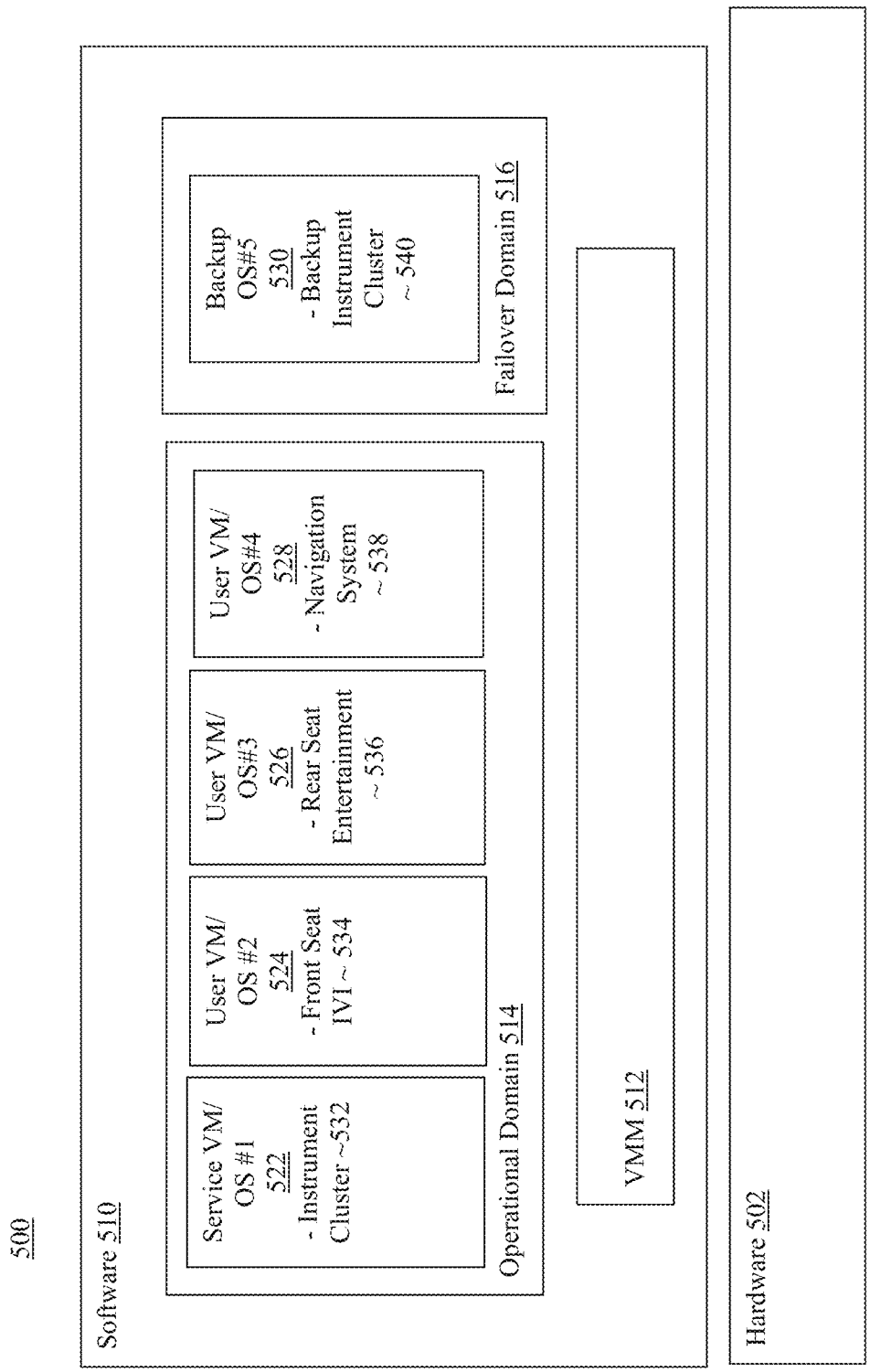
FIG. 5 illustrates a software component view of another example in-vehicle system having the failover/backup support of the present disclosure, according to various embodiments.

Referring now to FIG. 5, wherein a software component view of another example in vehicle system having the failover/backup technology of the present disclosure, according to various embodiments, is illustrated. As shown, for the embodiments, in-vehicle system 500 includes hardware 502 and software 510. Software 510 includes virtual machine monitor (VMM) 512 arranged to create and host operations of two domains, operational domain 514 and failover domain 516. Operational domain 514 includes a number of virtual machines (VMs) 522-528, whereas failover domain 516 includes backup OS 530. VMs 522-528 include a service VM 522 and a number of user VMs 524-528. Service machine 522 includes a function rich service OS hosting execution of a number of instrument cluster applications/tasks 532 and/or services/utilities to service user VMs 524-528. User VMs 524-528 may include a first user VM 524 having a first user OS hosting execution of front seat infotainment applications 534, a second user VM 526 having a second user OS hosting execution of rear seat infotainment applications 536, a third user VM 528 having a third user OS hosting execution of navigation subsystem 538. Backup OS 530 includes backup versions 540 of instrument cluster applications/tasks 532. Backup OS 530 is a rudimentary, but substantially self-sufficient OS, with just enough functions (or a little more than necessary) to support execution of backup versions 540 of instrument cluster applications/tasks 532, without dependencies on service OS 522, and/or VMM 512, except for the ability of VMM 512 to create the different domains 514-516, and reassign needed hardware devices from operational domain 514 to failover domain 516.

As described earlier, during normal operation, backup OS 530 semi-actively stands-by and monitors for the failure of one of the critical and/or safety sensitive/consequential applications/tasks of instrument cluster 532. And on detection of such a failure, backup OS 530 becomes active, requests the necessary hardware resources not yet assigned, to be re-assigned from operational domain 514 to failover domain 516, and launches backup versions of instrument cluster 540 to substitute for instrument cluster applications/tasks 532. Thereafter, backup container 530 launches the backup/failover versions of the instrument cluster application/task 540 to substitute for instrument cluster application/task 532.

Figure 6:
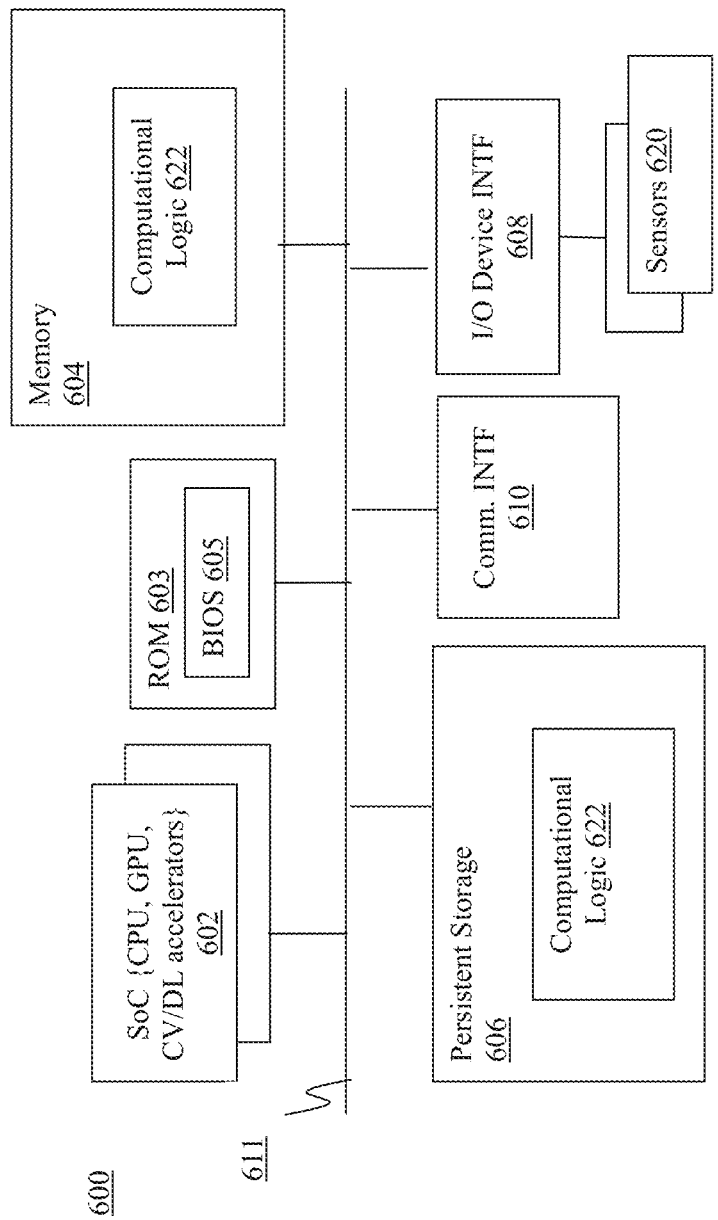
FIG. 6 illustrates a hardware component view of an example vehicle computing platform, according to various embodiments.

Except for the failover/backup teachings of the present disclosure, software 510 may otherwise be any one of a number of software elements known in the art Referring now to FIG. 6, wherein a hardware component view of an example vehicle computing platform having the failover/backup technology of the present disclosure, according to various embodiments, is illustrated. As shown, computing platform 600, which may be hardware 502 of FIG. 5. For the illustrated embodiments, computing platform 600 includes one or more system-on-chips (SoCs) 602, which may be SoC 301 of FIGS. 3a-3b. Additionally, computing platform 600 may include ROM 603 and system memory 604. As earlier described, each SoCs 602 may include one or more processor cores (CPUs), one or more graphics processor units (GPUs), one or more accelerators, such as computer vision (CV) and/or deep learning (DL) accelerators. ROM 603 may include basic input/output system services (BIOS) 605. CPUs, GPUs, and CV/DL accelerators may be any one of a number of these elements known in the art. Similarly, ROM 603 and BIOS 605 may be any one of a number of ROM and BIOS known in the art, and system memory 604 may be any one of a number of volatile storage devices known in the art.

Additionally, computing platform 600 may include persistent storage devices 606. Example of persistent storage devices 606 may include, but are not limited to, flash drives, hard drives, compact disc read-only memory (CD-ROM) and so forth. Further, computing platform 600 may include one or more input/output (I/O) interfaces 608 to interface with one or more I/O devices, such as sensors 620. Other example I/O devices may include, but are not limited to, display, keyboard, cursor control and so forth. Computing platform 600 may also include one or more communication interfaces 610 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 611, which may represent one or more buses. In the case of multiple buses, they may be bridged by one or more bus bridges (not shown).

Each of these elements may perform its conventional functions known in the art. ROM 603 may include BIOS 605 having a boot loader. System memory 604 and mass storage devices 606 may be employed to store a working copy and a permanent copy of the programming instructions implementing the operations associated with hypervisor 306, VMM 512, OS 308, 408, service/user OS of service/user VM 522-528, OS of backup container 530, components of navigation subsystem 130 or 538, collectively referred to as computational logic 622. The various elements may be implemented by assembler instructions supported by processor core(s) of SoCs 602 or high-level languages, such as, for example, C, that can be compiled into such instructions.

Figure 7:
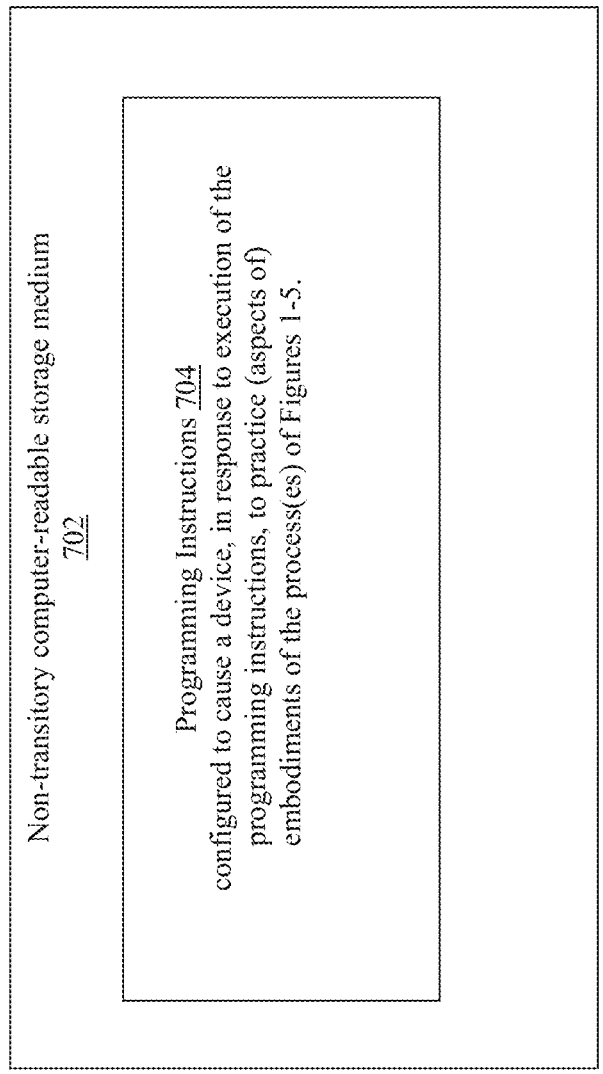
FIG. 7 illustrates a storage medium having instructions for practicing aspects of the methods described with references to FIGS. 1-5, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure described with references to FIGS. 1-5. As shown, non-transitory computer-readable storage medium 702 may include a number of programming instructions 704. Programming instructions 704 may be configured to enable a device, e.g., computing platform 600, in response to execution of the programming instructions, to implement (aspects of) hypervisor 306, VMM 512, OS 308, 408, service/user OS of service/user VM 522-528, OS of backup container 530, components of navigation subsystem 130 or 538. In alternate embodiments, programming instructions 704 may be disposed on multiple computer-readable non-transitory storage media 702 instead. In still other embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus, various example embodiments of the present disclosure have been described including, but are not limited to:

Example 1 is an apparatus for vehicular computing, comprising: a system-on-chip (SoC) having a plurality of cores; a hypervisor arranged to partition the plurality of cores into at least two domains, an operational domain and a failover domain for an in-vehicle system of a vehicle; a first operating system arranged to operate and manage execution of at least a first application in the operational domain to provide a first plurality of functions for the vehicle; a second operating system arranged to operate and manage execution of at least a second application in the failover domain to provide a second plurality of functions for the vehicle, on occurrence of a failure of the first application; wherein the second plurality of functions comprise a subset of the first plurality of functions or less embellished versions of some of the first plurality of functions, and the second operating system has less capabilities than the first operating system.

Example 2 is example 1, wherein the second operating system and the second application are semi-active standing by, prior to the occurrence of the failure of the first application, and the second operating system and the second application are to become active after the occurrence of the failure of the first application.

Example 3 is example 2, wherein the second operating system comprises a monitor arranged to monitor and detect for the occurrence of the failure of the first application, while being semi-active standing by.

Example 4 is example 1, wherein the apparatus further comprises a plurality of devices; and wherein the hypervisor and the second operating system are arranged to cooperate to re-assign at least a first of the plurality of devices from the operational domain to the failover domain, when the second operating system and the second application become active after occurrence of the failure of the first application.

Example 5 is example 4, wherein the first device is a graphics processing unit (GPU).

Example 6 is example 5, wherein the GPU is part of the SoC.

Example 7 is example 4, wherein the first device is not part of the SoC and is coupled with the SoC via a system bus.

Example 8 is any one of examples 1-7, wherein the first and second plurality of functions are functions of an instrument cluster of the vehicle.

Example 9 is any one of examples 1-8, wherein the SoC is a selected one of a virtualized or physical SoC.

Example 10 is any one of examples 1-9, wherein the vehicle is an autonomous driving vehicle.

Example 11 is a method for vehicular computing, comprising: hosting, by a hypervisor of a system-on-chip (SoC) disposed in a vehicle, an operational domain having a main operating system managing execution of a critical task of an in-vehicle system of the vehicle, and a backup domain having a backup operating system semi-actively standing by; receiving, by the hypervisor, from the backup operating system, a request to re-assign a device from the operational domain to the backup domain, submitted in response to the critical task being in an impaired or inoperative state; and in response to the request, re-assigning the device, by the hypervisor, from the operational domain to the backup domain to enable the backup operating system to launch execution of a backup version of the critical task in the backup domain to substitute for the critical task in the operational domain.

Example 12 is example 11, wherein the SoC includes a plurality of cores, and the device is one of a plurality of devices of the vehicle, and wherein the method further comprising prior to hosting the operational and backup domains, partitioning the plurality of cores and the plurality devices, and respectively assigning the partitioned plurality of cores and devices to the operational and backup domains.

Example 13 is example 11, wherein re-assigning comprises informing the device, by the hypervisor, of the reassignment.

Example 14 is example 11, wherein re-assigning further comprises unmapping memory mapped input-output (MMIO) space of the device from the main operating system, and mapping MMIO space of the device into the backup operating system.

Example 15 is any one of examples 11-14, wherein re-assigning further comprises invalidating virtualization tables maintained by the hypervisor for the device, and re-programming the virtualization tables to reflect re-assignment of the device to the backup operating system.

Example 16 is one or more computer-readable media having a plurality of instructions to cause a SoC of an in-vehicle system of a vehicle, in response to execution of the instructions by one or more cores of the SoC, to operate a safety operating system (OS) in a safety domain of the SoC to: semi-actively stand by to detect for impairment or failure of operation of a safety consequential task hosted by a main OS in an operational domain of the SoC; on detection of the safety consequential task being in the impaired or inoperable state, request re-assignment of a device from the operational domain to the safety domain; and on re-assignment of the device from the operational domain to the safety domain, become active and initiate execution of a safety version of the safety consequential task in the safety domain, to replace the impaired or inoperable safety consequential task of the operational domain.

Example 17 is example 16, wherein to detect for impairment or failure of operation of the safety consequential task comprises to send a ping to the main OS, and to determine whether a response to the ping is received from the main OS within a timing threshold.

Example 18 is example 16, wherein the safety OS is to further, on request of the reassignment of the device, query a configuration space of the device to determine whether the device has been re-assigned, and is now owned by the safety OS.

Example 19 is example 18, wherein the device is coupled to the SoC via a system bus, and to query a configuration space of the device comprises to query the configuration space of the device within a configuration space of the system bus.

Example 20 is example 16, wherein the safety OS is to further, on re-assignment of the device from the operational domain to the safety domain, reset the device or cause the device to be reset.

Example 21 is example 18, wherein the device is coupled to the SoC via a peripheral component interconnect (PCI) bus, and to reset the device or cause the device to be reset comprises issuing a PCI device reset.

Example 22 is example 20, wherein the safety OS is to further, on reset of the device, re-initialize or cause to be re-initialized the device.

Example 23 is example 22, wherein the device is a graphics processing unit (GPU), wherein to reset the device or cause the device to be reset comprises to request the device to reset, leading to the resetting of a render engine and a display engine of the GPU, and wherein to re-initialize or cause to be re-initialized the device comprises to re-initialize the display engine or cause the display engine to be re-initialized.

Example 24 is example 23, wherein the safety OS is to further, on re-initialization of the display engine of the GPU, allocate and map a plurality of frame buffers in a memory of the in-vehicle system, and on allocation and mapping of the plurality of frame buffers, render outputs of the safety version of the safety consequential task into the allocated and mapped frame buffers.

Example 25 is any one of examples 16-24, wherein the vehicle is an autonomous driving vehicle, and the safety consequential task comprises an instrument cluster task.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for vehicular computing, comprising:
    a system-on-chip (SoC) having a plurality of cores;
    a hypervisor arranged to partition the plurality of cores into at least two domains, an operational domain and a failover domain for an in-vehicle system of a vehicle;
    a first operating system arranged to operate and manage execution of at least a first application in the operational domain to provide a first plurality of functions for the vehicle; and
    a second operating system arranged to operate and manage execution of at least a second application in the failover domain to provide a second plurality of functions for the vehicle, on occurrence of a failure of the first application,
    wherein the second plurality of functions comprise a subset of the first plurality of functions or less embellished versions of some of the first plurality of functions, and the second operating system has less capabilities than the first operating system.

2. The apparatus of claim 1, wherein the second operating system and the second application are semi-active standing by, prior to the occurrence of the failure of the first application, and the second operating system and the second application are to become active after the occurrence of the failure of the first application.

3. The apparatus of claim 2, wherein the second operating system comprises a monitor arranged to monitor and detect for the occurrence of the failure of the first application, while being semi-active standing by.

4. The apparatus of claim 1, wherein the apparatus further comprises a plurality of devices; and wherein the hypervisor and the second operating system are arranged to cooperate to reassign at least a first of the plurality of devices from the operational domain to the failover domain, when the second operating system and the second application become active after occurrence of the failure of the first application.

5. The apparatus of claim 4, wherein the first device is a graphics processing unit (GPU).

6. The apparatus of claim 5, wherein the GPU is part of the SoC.

7. The apparatus of claim 4, wherein the first device is not part of the SoC and is coupled with the SoC via a system bus.

8. The apparatus of claim 1, wherein the first and second plurality of functions are functions of an instrument cluster of the vehicle.

9. The apparatus of claim 1, wherein the SoC is a selected one of a virtualized or physical SoC.

10. The apparatus of claim 1, wherein the vehicle is an autonomous driving vehicle.

11. A method for vehicular computing, comprising:
    hosting, by a hypervisor of a system-on-chip (SoC) disposed in a vehicle, an operational domain having a main operating system managing execution of a critical task of an in-vehicle system of the vehicle, and a backup domain having a backup operating system semi-actively standing by;
    receiving, by the hypervisor, from the backup operating system, a request to reassign a device from the operational domain to the backup domain, submitted in response to the critical task being in an impaired or inoperative state; and in response to the request, reassigning the device, by the hypervisor, from the operational domain to the backup domain to enable the backup operating system to launch execution of a backup version of the critical task in the backup domain to substitute for the critical task in the operational domain.

12. The method of claim 11, wherein the SoC includes a plurality of cores, and the device is one of a plurality of devices of the vehicle, and wherein the method further comprises:
prior to hosting the operational and backup domains, partitioning the plurality of cores and the plurality devices, and respectively assigning the partitioned plurality of cores and devices to the operational and backup domains.

13. The method of claim 11, wherein reassigning comprises informing the device, by the hypervisor, of the reassignment.

14. The method of claim 11, wherein reassigning further comprises unmapping memory mapped input-output (MMIO) space of the device from the main operating system, and mapping MMIO space of the device into the backup operating system.

15. The method of claim 11, wherein reassigning further comprises invalidating virtualization tables maintained by the hypervisor for the device, and re-programming the virtualization tables to reflect reassignment of the device to the backup operating system.

16. One or more computer-readable media (CRM) comprising a plurality of instructions to cause a system-on-chip (SoC) of an in-vehicle system of a vehicle, in response to execution of the instructions by one or more cores of the SoC, to operate a safety operating system (OS) in a safety domain of the SoC to:
semi-actively stand by to detect for impairment or failure of operation of a safety consequential task hosted by a main OS in an operational domain of the SoC;
on detection of the safety consequential task being in an impaired or inoperable state, request reassignment of a device from the operational domain to the safety domain; and
on reassignment of the device from the operational domain to the safety domain, become active and initiate execution of a safety version of the safety consequential task in the safety domain, to replace the impaired or inoperable safety consequential task of the operational domain.

17. The CRM of claim 16, wherein to detect for impairment or failure of operation of the safety consequential task comprises to send a ping to the main OS, and to determine whether a response to the ping is received from the main OS within a timing threshold.

18. The CRM of claim 16, wherein the safety OS is to further, on request of the reassignment of the device, query a configuration space of the device to determine whether the device has been reassigned, and is now owned by the safety OS.

19. The CRM of claim 18, wherein the device is coupled to the SoC via a system bus, and to query the configuration space of the device comprises to query the configuration space of the device within a configuration space of the system bus.

20. The CRM of claim 16, wherein the safety OS is to further, on re-assignment of the device from the operational domain to the safety domain, reset the device or cause the device to be reset.

21. The CRM of claim 18, wherein the device is coupled to the SoC via a peripheral component interconnect (PCI) bus, and to reset the device or cause the device to be reset comprises issuing a PCI device reset.

22. The CRM of claim 20, wherein the safety OS is to further, on reset of the device, re-initialize or cause to be re-initialized the device.

23. The CRM of claim 22, wherein the device is a graphics processing unit (GPU), wherein to reset the device or cause the device to be reset comprises to request the device to reset, leading to the resetting of a render engine and a display engine of the GPU, and wherein to re-initialize or cause to be re-initialized the device comprises to re-initialize the display engine or cause the display engine to be re-initialized.

24. The CRM of claim 23, wherein the safety OS is to further, on re-initialization of the display engine of the GPU, allocate and map a plurality of frame buffers in a memory of the in-vehicle system, and on allocation and mapping of the plurality of frame buffers, render outputs of the safety version of the safety consequential task into the allocated and mapped frame buffers.

25. The CRM of claim 16, wherein the vehicle is an autonomous driving vehicle, and the safety consequential task comprises an instrument cluster task.

* * * * *